US012135573B2

(12) United States Patent
Abbasi

(10) Patent No.: US 12,135,573 B2
(45) Date of Patent: Nov. 5, 2024

(54) LOW DROPOUT REGULATOR

(71) Applicant: Key ASIC Inc., Hsinchu County (TW)

(72) Inventor: Shahbaz Abbasi, Hsinchu County (TW)

(73) Assignee: KEY ASIC INC., Hsinchu County (TW)

( * ) Notice: Subject to any disclaimer, the term of this patent is extended or adjusted under 35 U.S.C. 154(b) by 112 days.

(21) Appl. No.: 17/844,216

(22) Filed: Jun. 20, 2022

(65) Prior Publication Data

US 2023/0409061 A1 Dec. 21, 2023

(51) Int. Cl.

*G05F 1/565* (2006.01)
*G05F 1/46* (2006.01)
*G05F 3/26* (2006.01)

(52) U.S. Cl.

CPC .............. *G05F 1/565* (2013.01); *G05F 1/468* (2013.01); *G05F 3/262* (2013.01)

(58) Field of Classification Search

CPC . G05F 1/468; G05F 1/56; G05F 1/565; G05F 1/575; G05F 3/262

See application file for complete search history.

(56) References Cited

U.S. PATENT DOCUMENTS 7,902,801 B2 3/2011 Mandal
7,956,589 B1 6/2011 Fan
9,886,049 B2 2/2018 Qing et al.
2009/0001953 A1* 1/2009 Huang .................... G05F 1/575 323/281

OTHER PUBLICATIONS

European Patent Office search report Jun. 14, 2023.
Li Chengpeng et al: "FVF LDO regulator with dual dynamic-load composite gain stage", vol. 92, No. 1, Apr. 17, 2017, pp. 131-140.

* cited by examiner

*Primary Examiner* — Gary L Laxton
(74) *Attorney, Agent, or Firm* — WPAT, P.C

(57) ABSTRACT

A low dropout regulator is provided. The low dropout regulator includes a first gain-stage, a second gain-stage, an output setting stage, and a Miller circuit. The first gain-stage generates a signal at a first gain-stage terminal based on a signal at a second gain-stage signal. The second gain-stage receives the signal at the first gain-stage terminal and generates a signal at a sensing terminal. The output setting stage outputs a load current to an output terminal. The signal at the sensing terminal is changed with the load current. The Miller circuit is electrically connected to the first gain-stage, the second gain-stage, and the output setting stage. The Miller circuit provides a capacitance related to a dominant pole of the low dropout regulator. The capacitance is changed with the signal at the sensing terminal.

18 Claims, 6 Drawing Sheets

LOW DROPOUT REGULATOR

FIELD OF THE INVENTION

The present invention relates to a low dropout regulator, and more particularly to a capacitor-less low dropout regulator having a better power supply rejection ratio.

BACKGROUND OF THE INVENTION

In electronic devices, linear regulators are utilized to stabilize and transform a supply voltage Vdd to a steady output voltage Vout. A low dropout (hereinafter, LDO) regulator is a type of linear regulator having advantages such as low cost, low noise, and fast voltage conversion. As the conventional off-chip LDO regulators need a large output capacitor, which costs a huge area, capacitor-less LDO regulators have been developed.

In battery-powered products/applications, a switching DC/DC regulator is often connected directly to the battery for voltage conversion because the switching DC/DC regulator has high power efficiency. However, use of the switching DC/DC regulator is accompanied by lots of switching activities, and ripples are generated at the output voltage. Therefore, an LDO is needed at the output of switching DC/DC regulator to suppress the ripples.

The power supply rejection ratio (hereinafter, PSRR) is a critical LDO performance metric for measuring the amount of ripple suppression. Therefore, it is essential to have a high PSRR to be able to reduce the supply ripples effectively. The capacitor-less LDO regulator may encounter different load conditions that affect its PSRR, and a capacitor-less LDO regulator having better PSRR should be developed.

SUMMARY OF THE INVENTION

Therefore, the present invention relates to an LDO regulator having a load-dependent Miller circuit. The load-dependent Miller circuit is capable of altering its capacitance value in response to the load condition. The dynamic adjustment of the capacitance implies that the dominant pole of the LDO regulator can be shifted under different load conditions, and the PSRR of the LDO regulator can be improved.

An embodiment of the present invention provides a low dropout regulator. The low dropout regulator includes a first gain-stage, a second gain-stage, an output setting stage, and a Miller circuit. The first gain-stage generates a signal at a first gain-stage terminal based on a signal at a second gain-stage signal. The second gain-stage is electrically connected to the first gain-stage terminal. The second gain-stage receives the signal at the first gain-stage terminal and generates a signal at a sensing terminal. The output setting stage is electrically connected to the first gain-stage terminal and the sensing terminal. The output setting stage outputs a load current to an output terminal. The signal at the sensing terminal is changed with the load current. The Miller circuit is electrically connected to the first gain-stage, the second gain-stage, and the output setting stage. The Miller circuit provides a capacitance related to a dominant pole of the low dropout regulator. The capacitance is changed with the signal at the sensing terminal.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
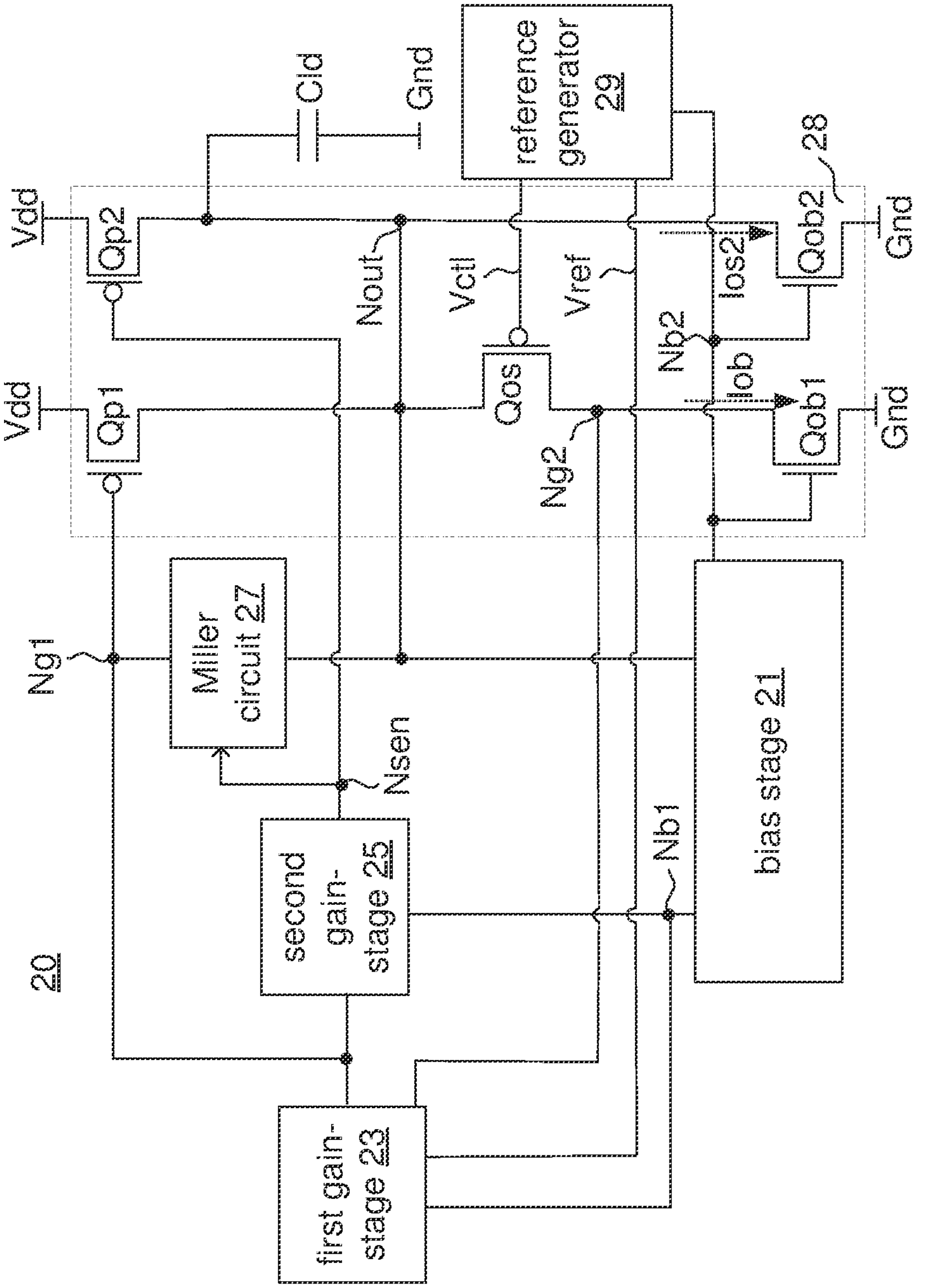
FIG. 1 is a block diagram illustrating a capacitor-less LDO regulator according to the embodiment of the present disclosure.

FIG. 1 is a block diagram illustrating a capacitor-less LDO regulator according to the embodiment of the present disclosure. The LDO regulator 20 includes a first gain-stage 23, a second gain-stage 25, a Miller circuit 27, an output setting stage 28, a reference generator 29, a bias stage 21, and a loading capacitor Cld. The loading capacitor Cld is electrically connected to an output terminal Nout and a ground terminal Gnd.

Functions of the components in the LDO regulator 20 are introduced. The output setting stage 28 has a flipped voltage follower (hereinafter, FVF) based scheme. The second gain-stage 25 attributes the total loop gain when the LDO regulator 20 operates under a heavy load condition. The first gain-stage 23 is electrically connected to gain-stage terminals Ng1, Ng2, and the second gain-stage 25 is electrically connected to the gain-stage terminal Ng1 and a sensing terminal Nsen.

The Miller circuit 27 is electrically connected to the output terminal Nout, the gain-stage terminal Ng1, and the sensing terminal Nsen. The Miller circuit 27 is utilized for frequency compensation, and the capacitance value of the Miller circuit 27 is freely adjusted in response to the signal at the sensing terminal Nsen.

The output setting stage 28 is electrically connected to the output terminal Nout, the gain-stage terminals Ng1, Ng2, and the sensing terminal Nsen. The output setting stage 28 should continuously output a stable output voltage Vout to the output terminal Nout. The reference generator 29 provides a control voltage Vctl to the output setting stage 28, and a reference voltage Vref to the first gain-stage 23.

The connections related to the bias stage 21 and the reference generator 29 are explained. The bias stage 21 is electrically connected to the first gain-stage 23 and the second gain-stage 25 via a bias terminal Nb1, and electrically connected to the output setting stage 28 via the output terminal Nout and a bias terminal Nb2. The reference generator 29 is electrically connected to the bias stage 21, the first gain-stage 23, and the output setting stage 28. The exemplary internal designs of the bias stage 21, the first gain-stage 23, the second gain-stage 25, the Miller circuit 27, and the reference generator 29 are demonstrated in FIG. 2.

The output setting stage 28 includes power transistors Qp1, Qp2, an output setting transistor Qos, and output bias transistors Qob1, Qob2. The power transistors Qp1, Qp2, and the output setting transistor Qos are PMOS transistors, and the output bias transistors Qob1, Qob2 are NMOS transistors.

The source terminals of the power transistors Qp1, Qp2 are electrically connected to the supply voltage terminal Vdd, and the source terminals of the output bias transistors Qob1, Qob2 are electrically connected to the ground terminal Gnd. The gate terminal of the power transistor Qp1 is electrically connected to the output of the first gain-stage 23 (that is, the gain-stage terminal Ng1), and the gate terminal of the power transistor Qp2 is electrically connected to the output of the second gain-stage 25 (that is, the sensing terminal Nsen). Therefore, the power transistor Qp1 is selectively switched on in response to the signal at the gain-stage terminal Ng1, and the power transistor Qp2 is selectively switched on in response to the signal at the sensing terminal Nsen. The aspect ratio of the power transistor Qp2 is much greater than the aspect ratio of the power transistor Qp1. For example, the aspect ratio of the power transistor Qp2 is equivalent to fifty times or one hundred times the aspect ratio of the power transistor Qp1.

The drain terminals of the power transistors Qp1, Qp2, and the source terminal of the output setting transistor Qos are electrically connected to the output terminal Nout. The drain terminals of the output setting transistor Qos and the output bias transistor Qob1 are electrically connected to the gain-stage terminal Ng2. The drain terminal of the output bias transistor Qob2 is electrically connected to the output terminal Nout. The gate terminals of the output bias transistors Qob1, Qob2 are electrically connected to the bias terminal Nb2.

The aspect ratio of the output bias transistor Qob1 is greater than the aspect ratio of the output bias transistor Qob2. For example, the aspect ratio of the output bias transistor Qob1 is equivalent to two times the aspect ratio of the power transistor Qob2. Thus, an output bias current Iob flowing through the output bias transistor Qob1 is equivalent to multiple of an output setting current Ios2 flowing through the output bias transistor Qob2, depending on the aspect ratios of the output bias transistors Qob1, Qob2.

Figure 2:
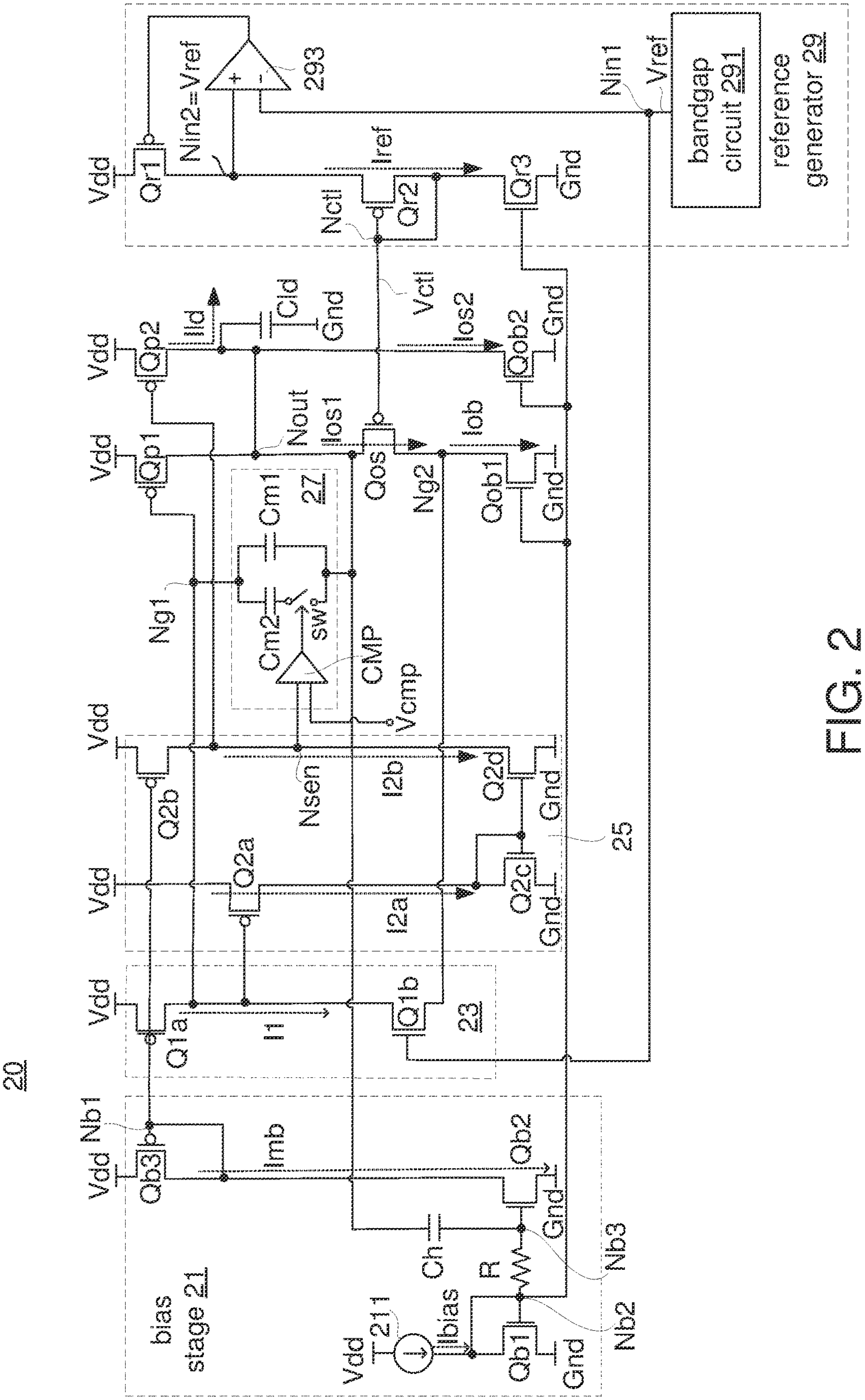
FIG. 2 is a schematic diagram illustrating an exemplary implementation of the exemplary capacitor-less LDO regulator according to the embodiment of the present disclosure.

FIG. 2 is a schematic diagram illustrating an exemplary implementation of the exemplary capacitor-less LDO regulator according to the embodiment of the present disclosure. Please refer to FIGS. 1 and 2 together. The internal components and their interconnections of the bias stage 21, the first gain-stage 23, the second gain-stage 25, the Miller circuit 27, and the reference generator 29 are respectively described below.

The bias stage 21 includes bias transistors Qb1, Qb2, Qb3, a current source 211, a resistor R, and a high-pass capacitor Ch. The bias transistor Qb3 is a PMOS transistor, and the bias transistors Qb1, Qb2 are NMOS transistors.

The bias transistors Qb1, Qb2 jointly form a current mirror, the aspect ratios of the bias transistors Qb1, Qb2 are assumed to be identical. The current source 211 is electrically connected to the supply voltage terminal Vdd and the bias terminal Nb2. The drain terminal and the gate terminal of the bias transistor Qb1 are electrically connected to the bias terminal Nb2. The resistor R is electrically connected to the bias terminals Nb2, Nb3. The drain terminal and the gate terminal of the bias transistor Qb2 are respectively electrically connected to a bias terminal Nb1 and the bias terminal Nb3. The high-pass capacitor Ch is electrically connected to the output terminal Nout and the bias terminal Nb3. The source terminals of the bias transistors Qb1, Qb2 are electrically connected to the ground terminal Gnd. The gate terminal and the drain terminal of the bias transistor Qb3 are electrically connected to the bias terminal Nb1, and the source terminal of the bias transistor Qb3 is electrically connected to the supply voltage terminal Vdd.

In the bias stage 21, the current source 211 continuously provides a sink bias current Ibias. The sink bias current Ibias has a constant current value, and the sink bias current Ibias flows through the bias transistor Qb1. Based on the current mirror structure, the mirrored bias current Imb flowing through the bias transistors Qb3, Qb2 is related to the sink bias current Ibias.

The high-pass capacitor Ch and the resistor R jointly provide a high-pass function. If there is an overshoot at the output voltage Vout, the high-frequency component of the output voltage Vout variation passes through the high-pass capacitor Ch. Through the high-pass capacitor Ch, a high current is injected momentarily, and the bias terminal Nb3 rises instantaneously. After that, the signal at the bias terminal Nb3 gradually returns to its original value. With the resistor R, the sudden change of the output voltage Vout is not directly conducted to the bias terminal Nb2, and the sink bias current Ibias can remain constant.

The first gain-stage 23 includes first-stage transistors Q1*a*, Q1*b*. The first-stage transistor Q1*a* is a PMOS transistor, and the first-stage transistor Q1*b* is an NMOS transistor. The source terminal, gate terminal, and the drain terminal of the first-stage transistor Q1*a* are respectively electrically connected to the supply voltage terminal Vdd, the bias terminal Nb1, and the gain-stage terminal Ng1. As the bias transistor Qb3 and the first-stage transistor Q1*a* form a current mirror, a first-stage current I1 is generated by duplicating the mirrored bias current Imb. The drain terminal, the gate terminal, and the source terminal of the first-stage transistor Q1*b* are respectively electrically connected to the gain-stage terminal Ng1, an inverting input terminal Nin1, and the gain-stage terminal Ng2.

In the first gain-stage 23, the first-stage transistor Q1*b* can be considered as a common-gate stage providing a first gain value G1, and the first-stage transistor Q1*a* provides a bias current to the common-gate stage. In the case that the output voltage Vout has a sudden change, the signal at the gain-stage terminal Ng1 might be temporarily affected, and the first-stage current I1 might be affected momentarily.

The second gain-stage 25 includes second-stage transistors Q2*a*, Q2*b*, Q2*c*, Q2*d*. The second-stage transistors Q2*a*, Q2*b* are PMOS transistors, and the second-stage transistors Q2*c*, Q2*d* are NMOS transistors. The source terminal and the gate terminal of the second-stage transistor Q2*a* are respectively electrically connected to the supply voltage terminal Vdd and the gain-stage terminal Ng1. The source terminal and the gate terminal of the second-stage transistor Q2*b* are respectively electrically connected to the supply voltage terminal Vdd and the bias terminal Nb1.

Thus, the second-stage transistor Q2*a* is controlled by a voltage difference between the supply voltage Vdd (at its source terminal) and the signal at the gain-stage terminal Ng1 (at its gate terminal), and the second-stage transistor Q2*a* can be considered as a voltage to current converter. If the signal at the gain-stage terminal Ng1 increases, the voltage difference between the source terminal and the gate terminal of the second-stage transistor Q2*a* becomes smaller, and the second-stage current I2*a* decreases. If the signal at the gain-stage terminal Ng1 decreases, the voltage difference between the source terminal and the gate terminal of the second-stage transistor Q2*a* becomes greater, and the second-stage current I2*a* increases.

The drain terminals of the second-stage transistors Q2*a*, Q2*c*, and the gate terminal of the second-stage transistor Q2*c* are electrically connected together. The drain terminals of the second-stage transistors Q2*b*, Q2*d* are electrically connected together. The source terminals of the second-stage transistors Q2*c*, Q2*d* are electrically connected to the ground terminal Gnd.

In the second gain-stage 25, the second-stage transistors Q2*a*, Q2*c* can be considered a first second-stage branch, and the second-stage transistors Q2*b*, Q2*d* can be considered a second second-stage branch. For the first second-stage branch, the second-stage current I2*a* flows through the second-stage transistors Q2*a*, Q2*c* if the second-stage transistor Q2*a* is switched on. For the second second-sage branch, a second-stage current I2*b* flows through the second-stage transistors Q2*b*, Q2*d*. The combination of the second-stage transistors Q2*b*, Q2*d* can be considered as a common source amplifier, in which the second-stage transistor Q2*d* is an input transistor, and the second-stage transistor Q2*b* is an active load.

The second-stage transistors Q2*c*, Q2*d* jointly form another current mirror. The bias transistor Q2*d* duplicates the second-stage current I2*a* from the bias transistor Q2*c* and generates the second-stage current I2*b*.

The signal at the sensing terminal Nsen is related to the second-stage current I2*b*, and the operation of the Miller circuit 27 is related to the signal at the sensing terminal Nsen. The Miller circuit 27 includes Miller capacitors Cm1, Cm2, a comparator CMP and a switch sw. The capacitance of the Miller capacitor Cm2 is much greater than the capacitance of the Miller capacitor Cm1 (Cm2>Cm1).

The capacitor Cm1 is electrically connected to the gain-stage terminal Ng1 and the output terminal Nout. The capacitor Cm2 and the switch sw are connected in serial. A terminal of the capacitor Cm2 is electrically connected to one of the gain-stage terminal Ng1 and the output terminal Nout, and the other terminal of the capacitor Cm2 is electrically connected to the switch sw. The switch sw is electrically connected to an output terminal of the comparator CMP, and the other of the gain-stage terminal Ng1 and the output terminal Nout. The comparator CMP is electrically connected to the sensing terminal Nsen and an internal/external voltage source.

The comparator CMP receives the signal at the sensing terminal Nsen and a comparison voltage Vcmp. The value of the comparison voltage Vcmp can be freely set by the designer based on the desired transition point (in terms of load current Ild). The source of the comparison voltage Vcmp is not limited. For example, the comparison voltage Vcmp might originate from an internal voltage source or an external voltage source.

The comparator CMP generates its output to the switch sw, based on satisfaction of a predefined condition. The predefined condition compares the comparison voltage Vcmp with the signal at the sensing terminal Nsen. The output of the comparator CMP is set to a logic high (H) if the signal at the sensing terminal Nsen is higher than or equivalent to the comparison voltage Vcmp (predefined condition is not satisfied). The output of the comparator CMP is set to a logic low (L) if the signal at the sensing terminal Nsen is lower than the comparison voltage Vcmp (predefined condition is satisfied).

According to the output of the comparator CMP, the switch sw is selectively switched on or off, and the capacitance value of the Miller circuit 27 is dynamically changed. The operations of the Miller circuit 27 are summarized in Table 1.

TABLE 1

Figure 4A:
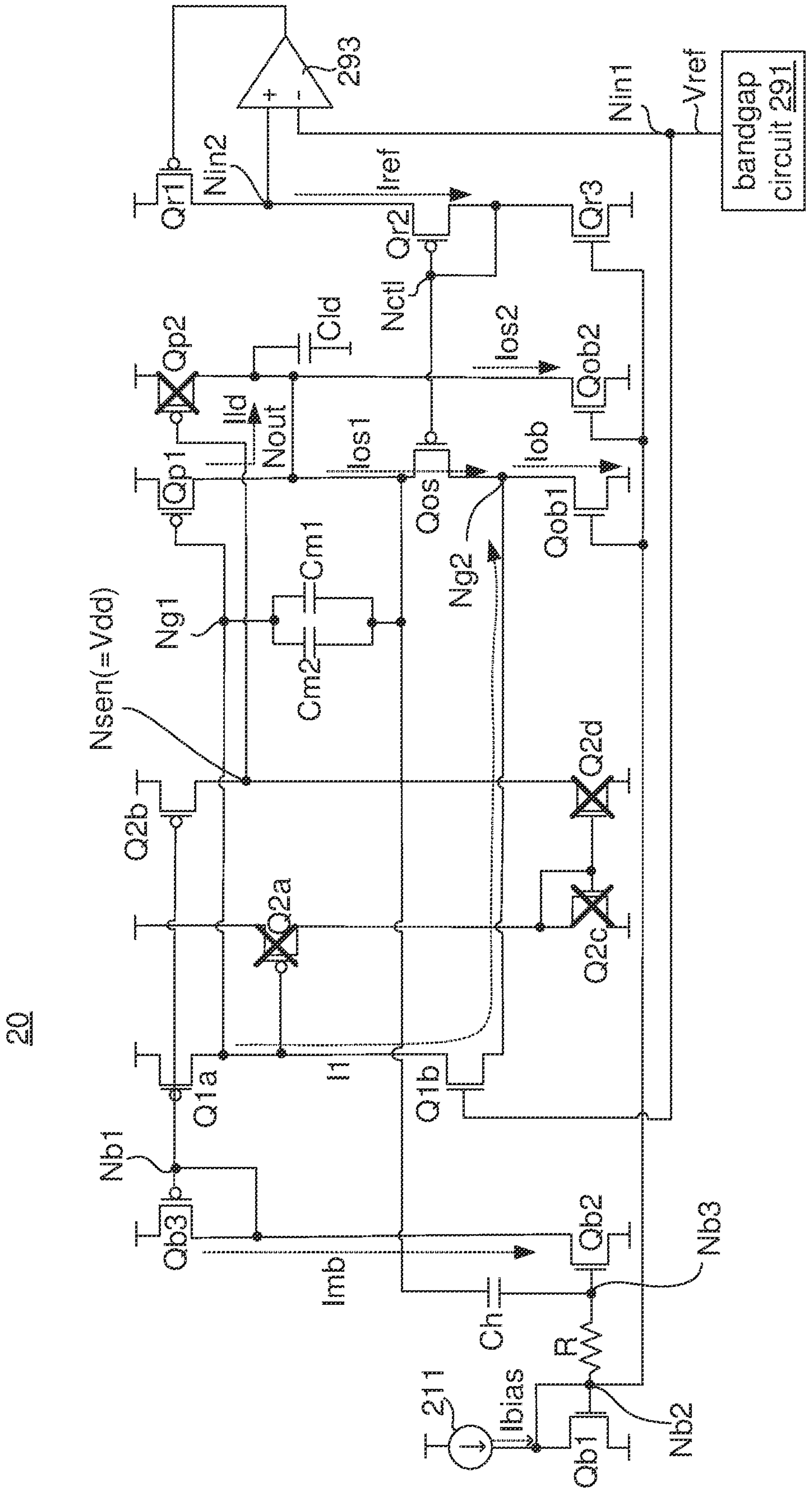
FIGS. 4A, 4B, and 4C are schematic diagrams, respectively illustrating that the capacitor-less LDO regulator in FIG. 2 operates at the light load state (ST1), the in-transition state (ST2), and the heavy load state (ST3).
Figure 4B:
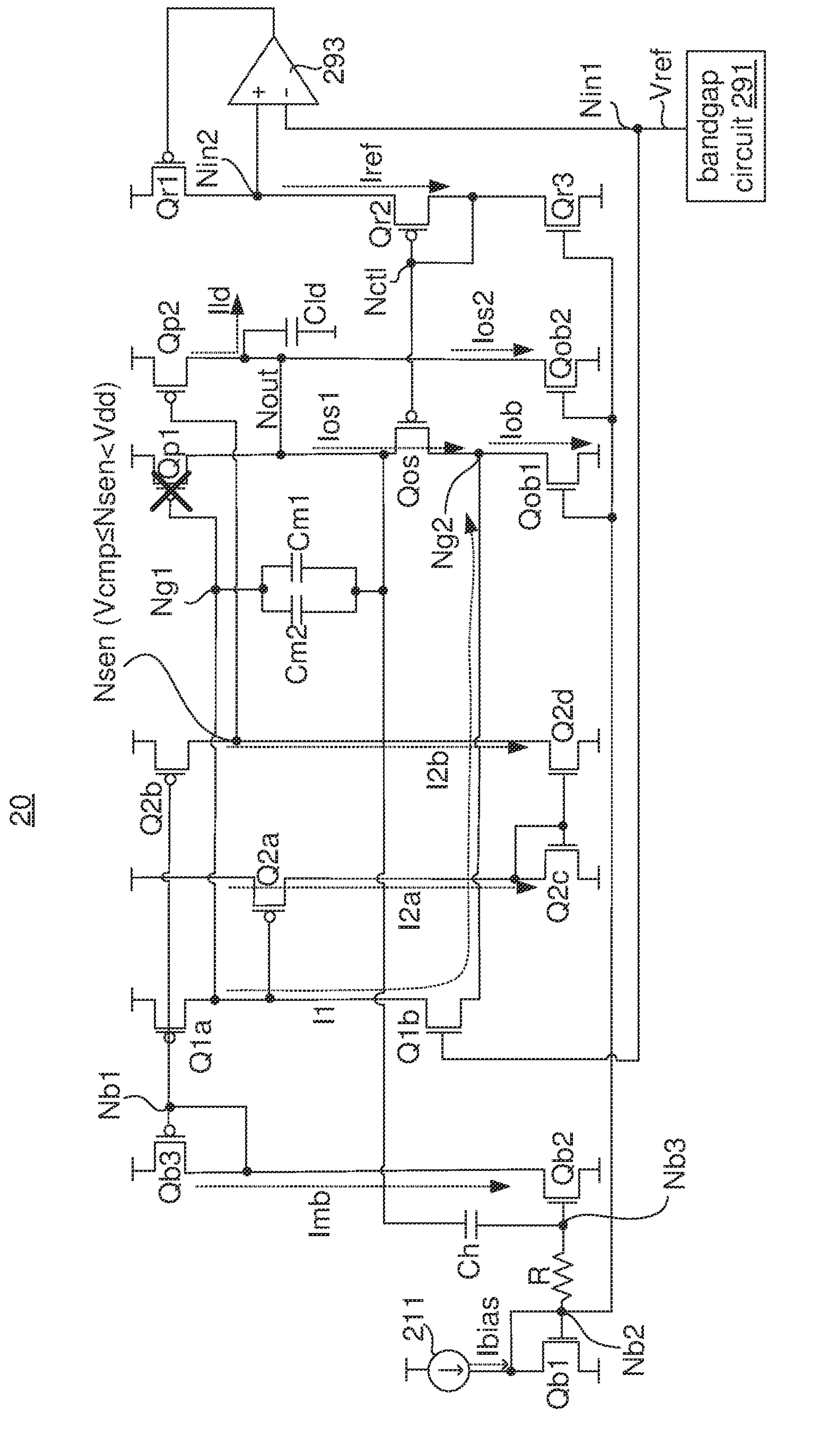
Figure 4C:
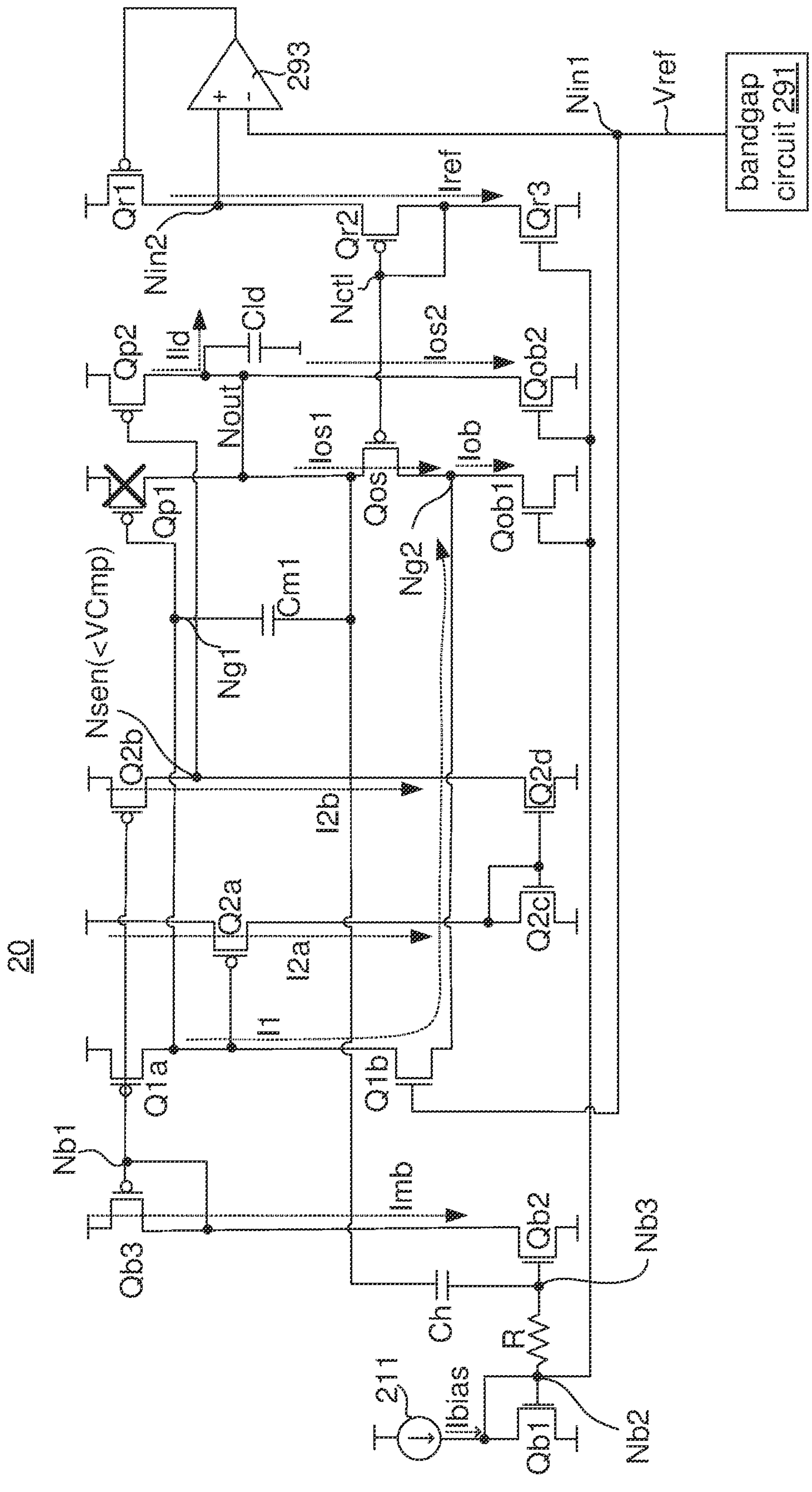

| | relationship between inputs of comparator CMP | |
|---|---|---|
| | Nsen ≥ Vcmp | Nsen < Vcmp |
| state of switch sw | ON | OFF |
| capacitance value of Miller circuit | Cm1 + Cm2 | Cm1 |
| FIG. | FIGS. 4A and 4B | FIG. 4C |

The reference generator 29 includes a bandgap circuit 291, reference transistors Qr1, Qr2, Qr3, and an operational amplifier 293. The bandgap circuit 291 outputs a stable reference voltage Vref to an inverting input terminal Nin1 of the operational amplifier 293 and the gate terminal of the first-stage transistor Q1*b*. Thus, the first-stage transistor Q1*b* remains to be switched on.

The source terminal, the gate terminal, and the drain terminal of the reference transistor Qr1 are respectively electrically connected to the supply voltage terminal Vdd, the output terminal of the operational amplifier 293, and the non-inverting input terminal Nin2 of the operational amplifier 293. The source terminal of the reference transistor Qr2 is electrically connected to the non-inverting terminal Nin2 of the operational amplifier 293, and the gate terminal and the drain terminal of the reference transistor Q2 are electrically connected to a control terminal Nctl. The drain terminal, the gate terminal, and the source terminal of the reference transistor Qr3 are respectively electrically connected to the control terminal Nctl, the bias terminal Nb2, and the ground terminal Gnd.

Please note that the reference transistor Qr2 and the output setting transistor Qos form a current mirror. Therefore, the output setting current Ios1 flowing through the output setting transistor Qos duplicates the reference current Iref flowing through the reference transistor Qr2.

Moreover, based on the current mirror structure, the signal at the output terminal Nout is equivalent to the non-inverting input terminal Nin2 of the operational amplifier 293. Together with the virtual short feature of the operational amplifier 293 (Nin1=Nin2), the output voltage Vout is equivalent to the reference voltage Vref (Nout=Nin2=Nin1=Vref).

At the gain-stage terminal Ng2, the output setting current Ios1 and the first-stage current I1 are merged together to generate the output bias current Iob. As the output bias transistor Qob1 and the bias transistor Qb1 form a current mirror, and the output bias transistor Qob1 has a greater aspect ratio, the output bias current Iob is constant and proportional to the sink bias current Ibias. Accordingly, changes of the output setting current Ios1 and the first-stage current I1 are negatively correlated.

Figure 3:
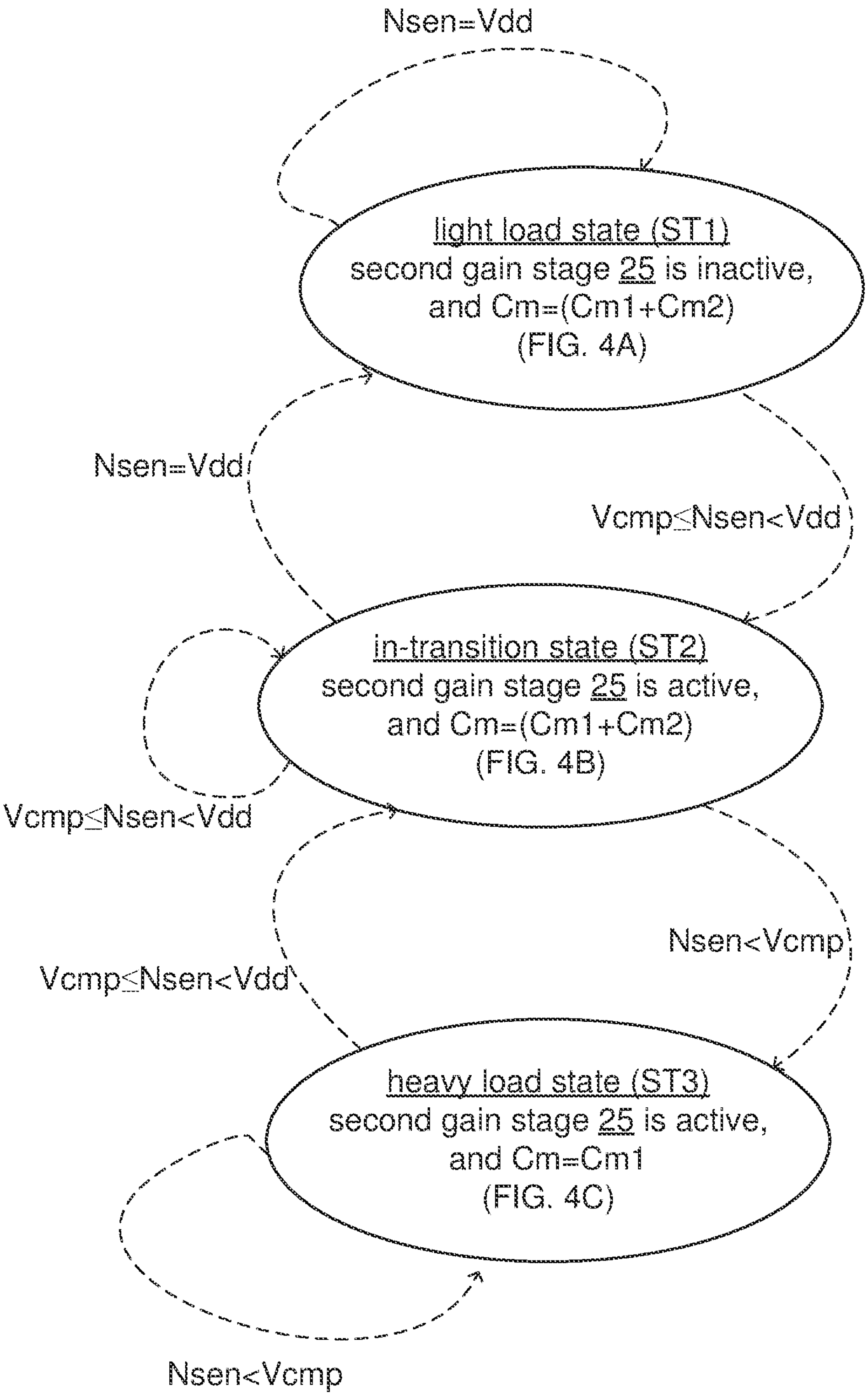
FIG. 3 is a flow diagram illustrating the operation of the capacitor-less LDO regulator in FIG. 2.

FIG. 3 is a state diagram illustrating the operation states of the capacitor-less LDO regulator in FIG. 2. According to the embodiment of the present disclosure, the LDO regulator 20 may operate in three operation states. Details about the internal signals of the LDO in these operation states ST1, ST2, ST3 are respectively shown in FIGS. 4A, 4B, and 4C.

FIGS. 4A, 4B, and 4C are schematic diagrams, respectively illustrating that the capacitor-less LDO regulator in FIG. 2 operates at the light load state (ST1), the in-transition state (ST2), and the heavy load state (ST3). Please refer to FIGS. 3, 4A, 4B, and 4C together.

When the LDO regulator 20 encounters the light load condition, the load current Ild decreases suddenly, and the signal at the output terminal Nout increases abruptly (an overshoot occurs). At the output terminal Nout, the current flowing through the power transistor(s) Qp1 split into two branches, a load current Ild and the output setting current Ios1. Thus, the output setting current Ios1 is increased when the load current Ild is decreased. Meanwhile, based on the negative correlation between the output setting current Ios1 and the first-stage current I1, the first-stage current I1 is decreased. Soon after the overshoot occurs, the signal at the output terminal Nout needs to be decreased/recovered. This implies that the conduction path between the supply voltage Vdd and the output terminal Nout needs a smaller current to suppress the overshoot.

As the decreased first-stage current I1 flows through the first-stage transistor Q1*a*, a small voltage difference exists between the supply voltage Vdd and the gain-stage terminal Ng1. Therefore, the small voltage difference between the supply voltage Vdd and the gain-stage terminal Ng1 is enough to switch on the power transistor Qp1, but not enough to switch on the second-stage transistor Q2*a*. The conduction of the power transistor Qp1 allows the small current to flow from the supply voltage Vdd to the output terminal Nout. Moreover, the cutoff of the second-stage transistor Q2*a* implies that none of the second-stage currents I2*a*, I2*b* is generated and the second-stage transistors Q2*c*, Q2*d* are switched off.

As the bias transistor Qb3 and the second-stage transistor Q2*b* form a current mirror, the signals at the drain terminals of the bias transistor Qb3 and the second-stage transistor Q2*b* are equivalent. Thus, the second-stage transistor Q2*b* is switched on, as the bias transistor Qb3 is. As there is no second-stage current I2*b*, the signal at the sensing terminal Nsen is not dragged down. Therefore, the sensing terminal Nsen is set to the supply voltage Vdd (Nsen=Vdd) because the second-stage transistor Q2*b* is switched on. Once the sensing terminal Nsen is set to the supply voltage Vdd (Nsen=Vdd), the power transistor Qp2 is switched off, and the comparator CMP outputs a logic high to switch on the switch sw. In short, the second gain-stage 25 is inactive, and the Miller circuit 27 provides a greater capacitance value (Cm=Cm1+Cm2) at a light load state ST1 (see FIG. 4A).

When the LDO regulator 20 encounters the heavy load condition, the load current Ild increases suddenly, and the signal at the output terminal Nout decreases abruptly (an undershoot occurs). Meanwhile, the output setting current Ios1 decreases, and the first-stage current I1 increases. Soon after the undershoot occurs, the signal at the output terminal Nout needs to be increased/recovered. This implies that the conduction path between the supply voltage Vdd and the output terminal Nout needs a greater current to pull up the output terminal Nout to eliminate the undershoot.

As the increased first-stage current I1 flows through the first-stage transistor Q1*b*, the signal at the gain-stage terminal Ng1 is dragged by the first-stage current I1. Consequentially, a bigger voltage difference exists between the supply voltage Vdd and the gain-stage terminal Ng1. Therefore, the voltage difference between the supply voltage Vdd and the gain-stage terminal Ng1 becomes greater, and the gain-stage terminal Ng1 is high enough to switch on the second-stage transistor Q2*a*.

After the second-stage transistor Q2*a* is switched on, the second-stage current I2*a* generates and increases, so as its mirrored current, the second-stage current I2*b*. With the increasing second-stage current I2*b*, the signal at the sensing terminal Nsen gradually decreases from the supply voltage Vdd, and the power transistor Qp2 is switched on.

As mentioned above, the aspect ratio of the power transistor Qp2 is much greater than the aspect ratio of the power transistor Qp1. Therefore, when the load current Ild is high in heavy load conditions, the power transistor Qp1 cannot support such a high current, and there will be no current flowing through the power transistor Qp1. As there is no current flowing through the power transistor Qp1, the voltage difference between the gate terminal and the source terminal Vgs of the power transistor Qp1 becomes a small value. Consequentially, the gain-stage terminal Ng1 will go high to turn off the power transistor Qp1. Therefore, the power transistor Qp1 is switched off, and the gain-stage terminal Ng1 goes high once the second-stage transistor Q2*a* is switched on.

Depending on the output of the comparator CMP, the decreasing procedure of the signal at the sensing terminal Nsen can be separated into two parts. In the first part, the signal at the sensing terminal Nsen is still greater than or equivalent to the comparison voltage Vcmp (that is, Vcmp≤Nsen<Vdd). In the second part, the signal at the sensing terminal Nsen is lower than the comparison voltage Vcmp (that is, Nsen<Vcmp).

As the comparator CMP outputs a logic high to switch on the switch sw in the first part of the decreasing procedure of the signal at the sensing terminal Nsen, the Miller circuit 27 provides a greater capacitance value (Cm=Cm1+Cm2). Therefore, the second gain-stage 25 is active, and the Miller circuit 27 provides the greater capacitance value (Cm=Cm1+Cm2) at an in-transition state ST2 (see FIG. 4B).

As the comparator CMP outputs a logic low to switch off the switch sw in the second part of the decreasing procedure of the signal at the sensing terminal Nsen, the Miller circuit 27 provides a smaller capacitance value (Cm=Cm1). Therefore, the second gain-stage 25 is active, and the Miller circuit 27 provides the smaller capacitance value (Cm=Cm1) at a heavy load state ST3 (see FIG. 4C).

The state transition directions are related to changes in the signal at the sensing terminal Nsen. The dotted arrows show how the operation state of the LDO regulator 20 reflects the changes of the sensing terminal Nsen. For the sake of comparison, details about the state transition are not explained but are summarized in Table 2.

TABLE 2

| operation state | capacitance value of Miller circuit | origin of load current Ild | state of Nsen | state transition |
|---|---|---|---|---|
| light load state (ST1) | Cm = Cm1 + Cm2 | Qp1 | Nsen maintains unchanged | ST1 |
| | | | Nsen decreases | ST1→ST2 |
| in-transition state (ST2) | Cm = Cm1 + Cm2 | Qp2 | Nsen increases and becomes Vdd | ST2→ST1 |
| | | | Nsen changes within Vcmp and Vdd | ST2 |
| | | | Nsen decreases and becomes lower than Vdmp | ST2→ST3 |
| heavy load state (ST3) | Cm = Cm1 | Qp2 | Nsen remains to be lower than Vcmp | ST3 |
| | | | Nsen increases | ST3→ST2 |

In a case where the capacitor-less LDO regulator without the Miller circuit 27 operates under light load conditions, the load pole at the output terminal Nout is located at low frequency, and the phase margin is limited. Consequentially, the capacitor-less LDO regulator without the Miller circuit 27 is unstable in light load conditions.

According to the embodiment of the present disclosure, the Miller circuit 27 provides a greater capacitance value (Cm=Cm1+Cm2) when the LDO regulator 20 operates under the light load condition. By doing so, the load pole is shifted to a higher frequency, and the pole at the gain-stage terminal Ng1 becomes the dominant pole of the LDO regulator 20.

When the LDO regulator 20 operates under heavy load conditions, the load pole at the output terminal Nout is located at a high frequency, and the LDO regulator 20 does not need a big capacitance value at the Miller circuit 27. Thus, the Miller circuit 27 provides a very small capacitance value (Cm=Cm1) to improve the PSRR of the LDO regulator 20.

The LDO regulator 20, according to the embodiment of the present disclosure, adopts a load-dependent Miller circuit 27 to adjust the position of the dominant pole of the LDO regulator 20. Therefore, the stability of the LDO regulator 20 can be improved, and the LDO regulator 20 could have better PSRR.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A low dropout regulator, comprising:

a first gain-stage, configured to generate a first signal at a first gain-stage terminal based on a second signal at a second gain-stage terminal;

a second gain-stage, electrically connected to the first gain-stage terminal, configured to receive the first signal at the first gain-stage terminal and generate a third signal at a sensing terminal;

an output setting stage, electrically connected to the first gain-stage terminal and the sensing terminal, configured to output a load current to an output terminal, wherein the third signal at the sensing terminal is changed with the load current; and a Miller circuit, electrically connected to the first gain-stage, the second gain-stage, and the output setting stage, configured to provide a capacitance related to a dominant pole of the low dropout regulator, wherein the capacitance is changed with the third signal at the sensing terminal;

wherein the first gain-stage comprises:

a first first-stage transistor, electrically connected to the first gain-stage terminal; and a second first-stage transistor, electrically connected to the first gain-stage terminal and the second gain-stage terminal, wherein the first signal at the first gain-stage terminal is changed with a first gain-stage current flowing through the first first-stage transistor and the second first-stage transistor; or wherein the output setting stage comprises:

a first power transistor, electrically connected to the first gain-stage terminal and the output terminal, configured to be selectively switched on in response to the first signal at the first gain-stage terminal; and a second power transistor, electrically connected to the sensing terminal and the output terminal, configured to be selectively switched on in response to the third signal at the sensing terminal, wherein a fourth signal at the output terminal is changed with switching statuses of the first power transistor and the second power transistor.

2. The low dropout regulator according to claim 1, wherein the capacitance is equivalent to a first capacitance value when the third signal at the sensing terminal is satisfied with a predefined condition, the capacitance is equivalent to a second capacitance value when the third signal at the sensing terminal is not satisfied with the predefined condition.

3. The low dropout regulator according to claim 2, wherein the first capacitance value is greater than the second capacitance value.

4. The low dropout regulator according to claim 2, wherein the predefined condition is satisfied if the third signal at the sensing terminal is lower than a comparison voltage.

5. The low dropout regulator according to claim 1, wherein the Miller circuit comprises:

a first Miller capacitor, electrically connected to the first gain-stage terminal and the output terminal;

a second Miller capacitor, electrically connected to one of the first gain-stage terminal and the output terminal, wherein capacitance of the second Miller capacitor is greater than capacitance of the first Miller capacitor; and a switch, electrically connected to the second Miller capacitor and the other of the first gain-stage terminal and the output terminal, configured to be selectively switched on in response to the third signal at the sensing terminal.

6. The low dropout regulator according to claim 5, wherein the Miller circuit further comprises:

a comparator, electrically connected to the sensing terminal and the switch, configured to receive a comparison voltage and generates an output based on the comparison voltage and the third signal at the sensing terminal.

7. The low dropout regulator according to claim 6, wherein the output of the comparator is set to a logic high when the third signal at the sensing terminal is greater than or equivalent to the comparison voltage, and the output of the comparator is set to a logic low when the third signal at the sensing terminal is lower than the comparison voltage.

8. The low dropout regulator according to claim 1, wherein the second gain-stage comprises:

a first second-stage transistor, electrically connected to the first gain-stage terminal, configured to be selectively switched on in response to the first signal at the first gain-stage terminal;

a second second-stage transistor, electrically connected to the sensing terminal;

a third second-stage transistor, electrically connected to the first second-stage transistor; and a fourth second-stage transistor, electrically connected to the second second-stage transistor and the third second-stage transistor, wherein a first second-stage current flowing through the first second-stage transistor and the third second-stage transistor is equivalent to a second second-stage current flowing through the second second-stage transistor and the fourth second-stage transistor.

9. The low dropout regulator according to claim 8, wherein the third signal at the sensing terminal is changed with the second second-stage current.

10. The low dropout regulator according to claim 1, wherein an undershoot occurs at the output terminal if the load current increases suddenly, and an overshoot occurs at the output terminal if the load current decreases suddenly.

11. The low dropout regulator according to claim 1, wherein an aspect ratio of the first power transistor is smaller than an aspect ratio of the second power transistor.

12. The low dropout regulator according to claim 1, wherein the first power transistor is switched on and the second power transistor is switched off when the load current is low, and the first power transistor is switched on when the load current is high.

13. The low dropout regulator according to claim 1, wherein the output setting stage further comprises:

an output setting transistor, electrically connected to the output terminal and the second gain-stage terminal, configured to set the fourth signal at the output terminal to be equivalent to a reference voltage based on a control voltage.

14. The low dropout regulator according to claim 13, further comprising:

a reference generator, electrically connected to the first gain-stage and the output setting stage, configured to receive the reference voltage and provide the control voltage based on the reference voltage, wherein the reference voltage and the control voltage are constant.

15. The low dropout regulator according to claim 14, wherein the reference generator comprises:

an operational amplifier, comprising a first input terminal, a second input terminal, and an amplifier output terminal, configured to receive the reference voltage at the first input terminal;

a first reference transistor, electrically connected to the second input terminal and the amplifier output terminal, configured to be selectively switched on in response to a fifth signal at the amplifier output terminal;

a second reference transistor, electrically connected to the output setting transistor and the second input terminal; and a third reference transistor, electrically connected to the second reference transistor, wherein a reference current sequentially flows through the first reference transistor, the second reference transistor, and the third reference transistor.

16. The low dropout regulator according to claim 15, wherein the second reference transistor and the output setting transistor form a current mirror, and an output setting current flowing through the output setting transistor is generated by duplicating the reference current.

17. The low dropout regulator according to claim 16, wherein the output setting current is changed with the forth signal at the output terminal.

18. The low dropout regulator according to claim 15, further comprising:

a bias stage, electrically connected to the first gain-stage, the second gain-stage, the Miller circuit, the output setting stage, and the reference generator, configured to provide a sink bias current, wherein the reference current is generated based on the sink bias current.

* * * * *